(12) United States Patent
Duermeier et al.

(10) Patent No.: US 6,871,662 B2
(45) Date of Patent: Mar. 29, 2005

(54) VENTILATION AND/OR PRESSURE-EQUALIZING SYSTEM FOR A FUEL TANK

(75) Inventors: Ewald Duermeier, Moeglingen (DE); Stefan Klein, Magstadt (DE); Michael Koenig, Filderstadt-Harthausen (DE); Stefan Leuchtenberg, Abstatt (DE); Dieter Scheurenbrand, Wolfschlugen (DE); Manfred Weil, Schorndorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/023,322

(22) Filed: Dec. 17, 2001

(65) Prior Publication Data

US 2002/0083974 A1 Jul. 4, 2002

(30) Foreign Application Priority Data

Dec. 19, 2000 (DE) ......................................... 100 63 389

(51) Int. Cl.[7] .............................................. F16K 24/04
(52) U.S. Cl. ........................ 137/43; 137/202; 137/587
(58) Field of Search .......................... 137/43, 202, 587

(56) References Cited

U.S. PATENT DOCUMENTS

| | | | |
|---|---|---|---|
| 3,805,829 A | * | 4/1974 | Yamamoto et al. .......... 137/587 |
| 4,512,499 A | | 4/1985 | Uuskallio |
| 5,762,093 A | * | 6/1998 | Whitley, II .................. 137/202 |
| 6,213,170 B1 | | 4/2001 | Burke et al. |
| 6,336,466 B1 | * | 1/2002 | Ganachaud et al. ........ 137/202 |
| 6,405,747 B1 | * | 6/2002 | King et al. .................. 137/202 |
| 6,425,379 B2 | * | 7/2002 | Shimamura et al. ......... 137/202 |
| 6,557,581 B2 | * | 5/2003 | Ehrman et al. .............. 137/202 |

FOREIGN PATENT DOCUMENTS

| | | |
|---|---|---|
| EP | 0 667 253 | 8/1995 |
| EP | 0 773 128 | 5/1997 |
| WO | 00/63042 | 10/2000 |

OTHER PUBLICATIONS

French Search Report (dated Sep. 16, 2004).

* cited by examiner

*Primary Examiner*—Gerald A. Michalsky
(74) *Attorney, Agent, or Firm*—Kenyon & Kenyon

(57) ABSTRACT

A ventilation and/or a pressure-equalizing system for a fuel tank, in particular for a fuel tank of a motor vehicle, includes at least one aeration and/or de-aeration line leading into the fuel tank, via which the gases and/or vapors may be removed from or conducted into the fuel tank. A collection device for liquid fuel is coupled into the aeration and/or de-aeration line, the collection device including at least two chambers, of which one is used as a temporary storage device for liquid fuel and is connected to a return line into the fuel tank.

32 Claims, 5 Drawing Sheets

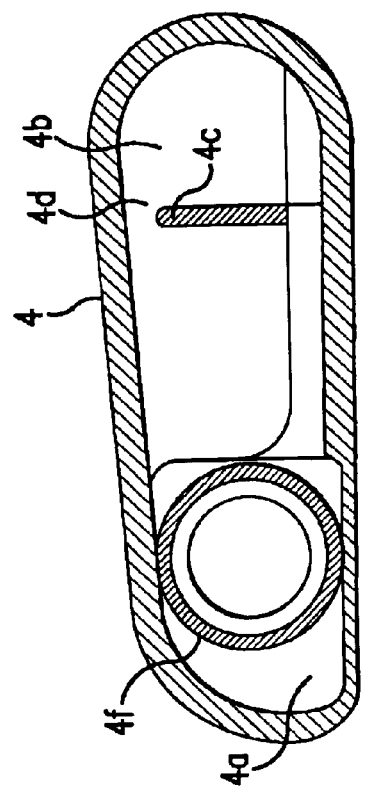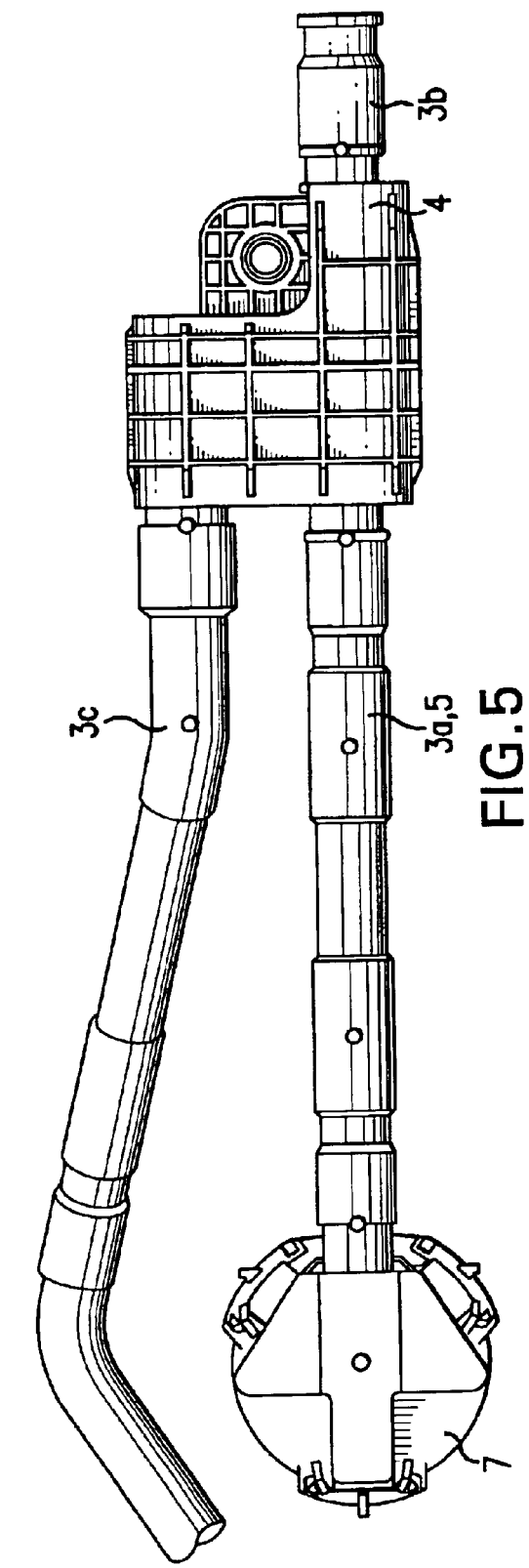

ND/OR PRESSURE-
EQUALIZING SYSTEM FOR A FUEL TANK

FIELD OF THE INVENTION

The present invention relates to a ventilation and/or pressure-equalizing system for a fuel tank, in particular for a fuel tank of a motor vehicle, having at least one aeration and/or de-aeration line leading into the fuel tank, via which the gases and/or vapors may be removed from the fuel tank or may be conducted into the fuel tank.

BACKGROUND INFORMATION

It is an object of the present invention to provide a ventilation and/or pressure-equalizing system for a fuel tank that reduces or prevents the penetration and trapping of liquid fuel.

SUMMARY

The above and other beneficial objects of the present invention are achieved by providing a ventilation and/or pressure-equalizing system for a fuel tank as described herein.

The ventilation and/or pressure-equalizing system according to the present invention includes a collection device having two adjacent, e.g., separate, chambers. One of the chambers is used as temporary storage for liquid fuel and is connected to a return line into the fuel tank. The chambers may be configured so that, given an approximately horizontal alignment of the fuel tank or the ventilation/pressure-equalizing system, no liquid fuel may travel from one chamber into the other. Fuel that has penetrated the ventilation/pressure-equalizing system in an undesired manner, may be collected in the chamber that is used as temporary storage. The return line allows for the appropriate chamber to be reliably emptied.

In an example embodiment of the present invention, the return line is simultaneously used as an aeration and/or de-aeration line, i.e., is identical with an aeration and/or de-aeration line. A ventilation/pressure-equalizing system configured in such a manner may be produced in a simple and cost-effective manner.

In a further example embodiment of the present invention, the return line has a gradient in the case of a horizontally aligned fuel tank. It empties at it lowest point into the fuel tank. In the case of a horizontally aligned fuel tank, the ventilation/pressure-equalizing system may be at least approximately horizontally aligned, so that the chamber, which is used as temporary storage, may be automatically emptied in a simple manner via the return line. In this context, the fuel returns to the (main) reservoir of the fuel tank.

In a further example embodiment of the present invention, the collection device is configured as a branching element. In this context, the collection device may be used as a simple flow obstacle and/or as a labyrinth.

In a further example embodiment of the present invention, the collection device connects at least one return line and at least two de-aeration lines to one another, the de-aeration lines each ending in different chambers of the collection device. In this context, a first de-aeration line may be arranged between the collection device and a tube line on the fuel tank side for discharging gases and/or vapors from the (main) reservoir of the fuel tank. A second de-aeration line is further arranged between the collection device and a line element, in particular a fuel vapor filter, located outside of the fuel tank. In this context, the first de-aeration line empties into a first chamber of the collection device, which is used as a temporary storage device, the return line also being connected to the chamber. Via the de-aeration lines, fuel vapors and/or other gases may be conducted out of the fuel tank or into the fuel tank, liquid fuel being able to be separated via the collection device from the gas/vapor flow. In particular, liquid fuel flowing in an undesired manner through the de-aeration line may be collected. An aeration/de-aeration line may be identical to a return line.

In a further example embodiment of the present invention, a, e.g., vertically aligned, wall, the wall having a through hole for gases and/or vapors, separates the chambers of the collection device from one another. The wall may be higher than the maximum fluid level to be expected or the maximum possible fluid level within the collection device in the case of a horizontally aligned fuel tank. The through hole is accordingly above this maximum level. The wall may be configured to be able to be overflowed in a dam-like manner.

In a further example embodiment of the present invention, a valve, e.g., a non-return valve or a float-roll-over valve, which prevents the liquid fuel from entering the line, is arranged in an aeration/de-aeration line, e.g., at the lowest point. At the same time, a line configured is such a manner may be used as a return line through which the separated fuel returns the (main) reservoir of the fuel tank.

Further features and feature combinations result from the description as well as the drawings. Example embodiments of the present invention are schematically illustrated in the Figures and are explained in detail in the description below.

BRIEF DESCRIPTION OF THE DRAWINGS

FIG. 4 is a cross-sectional view of the collection device illustrated in FIG. 2 taken along the line IV—IV.

FIG. 5 is a detail view of the ventilation/pressure-equalizing system illustrated in FIG. 1.

DETAILED DESCRIPTION

Figure 1:
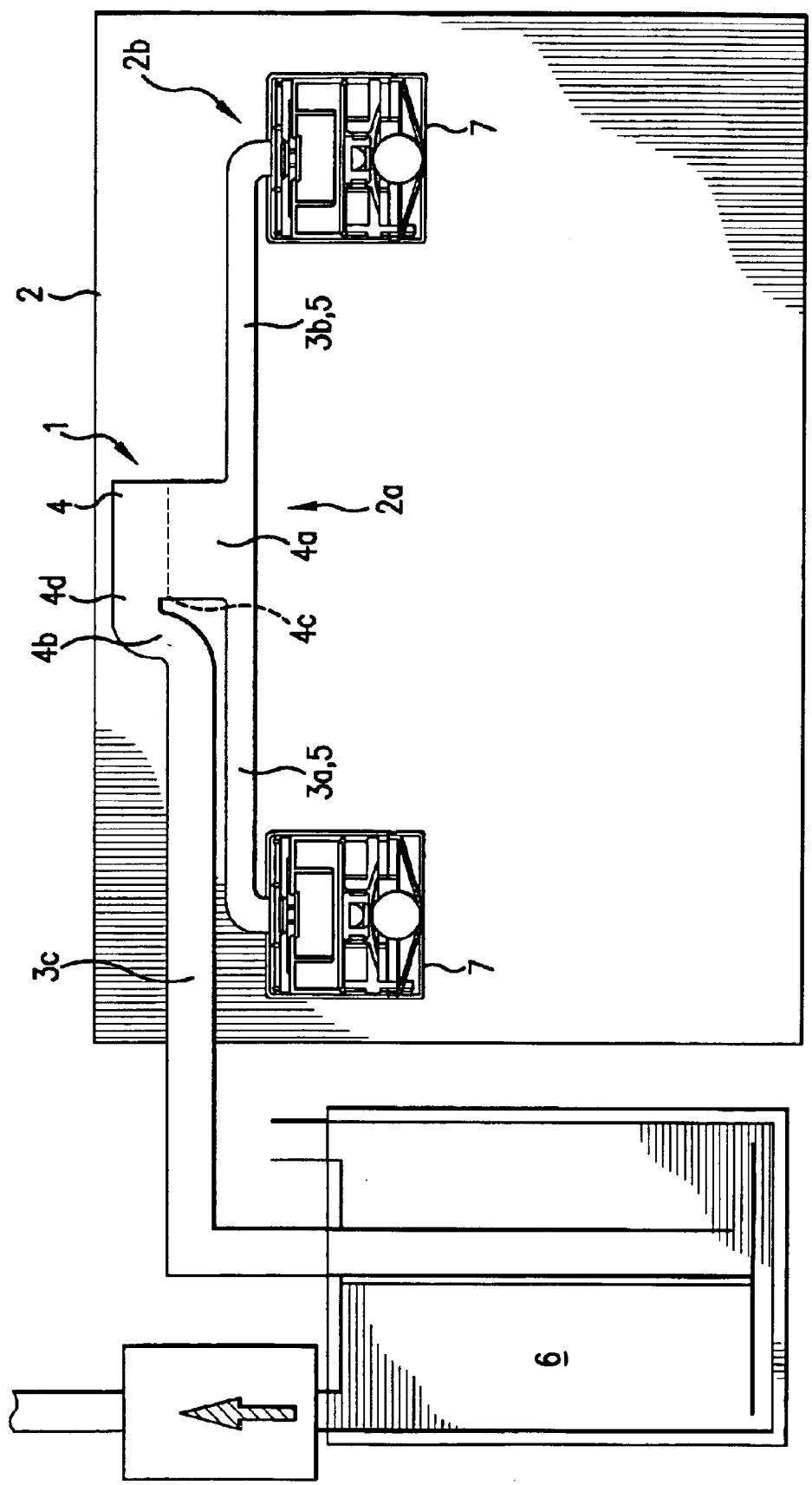
FIG. 1 is a view of a ventilation/pressure-equalizing system according to the present invention in a motor vehicle fuel tank.

FIG. 1 schematically illustrates a motor vehicle fuel tank (2) having a ventilation/pressure-equalizing system (1) according to the present invention. Fuel tank (2) is used to store liquid fuel, in particular a liquid hydrocarbon mixture, in a largely pressureless manner. Removal and filling devices are provided via which the liquid fuel may be removed from and/or directed to fuel tank (2). The filling device may include mechanical, hydraulic, and/or pneumatic sealing elements that seal the fuel tank on the side of the filling device during filling, i.e., when fuel is being supplied via a gas hose nozzle inserted into the filling device. In the case of such a configuration, gases may be discharged from the fuel tank for pressure relief via ventilation/pressure-equalizing system (1). In every case, ventilation/pressure-equalizing system (1) is used to aerate and de-aerate fuel tank (2) during normal operation.

A total of three de-aeration lines (3a, 3b, 3c), via which the gases may be discharged from the fuel tank, are provided as components of ventilation/pressure-equalizing system (1). Furthermore, valves (7), via which lines (3a, 3b) may be closed, are arranged at lines (3a, 3b), which empty into the main reservoir of fuel tank (2). In a modified example embodiment, aeration and de-aeration lines are provided.

To purify the gases discharged from the fuel tank, a fuel-vapor filter in the form of an active carbon filter (6) is provided that is connected to fuel tank (2) via ventilation/pressure-equalizing system (1).

De-aeration lines (3a, 3b) provided inside of fuel tank (2) both empty into a first chamber (4a) of a collection device (4), which is arranged in a middle region (2a) of the fuel tank, above the maximum fuel level for a horizontal fuel tank. Chamber (4a) forms a reservoir for liquid fuel that starts from lines (3a, 3b) and expands in an upward direction. In addition to first chamber (4a), collection device (4) includes a second chamber (4b), which is arranged next to and/or above first chamber (4a). Chambers (4a, 4b) are separated from one another by a wall (4c), a through hole (4d) for gases and/or vapors, which may not be blocked by fluid during normal operation due to its high position, ensuring the reliable ventilation of the fuel tank. As illustrated in FIG. 1, discharge-side second chamber (4b) extends directly over into de-aeration line (3c). The geometry of chambers (4a, 4b) and intermediary wall (4c) may include a labyrinth-like shape, so that liquid fuel is separated in first chamber (4a) of the collection device. In a modified example embodiment, the collection device is configured in a simplified manner in the form of a reverse siphon.

Given an almost horizontally arranged fuel tank, de-aeration lines (3a, 3b) provided inside of fuel tank (2) have a certain inclination—from middle region (2a), at which the highest point is located, to an outer region (2b), at which the lowest point is located and at which valves (7) are also positioned. Thus, not only gas may be discharged from the fuel tank via lines (3a, 3b). In the case of a horizontal arrangement of fuel tank (2), they are also used as return lines (5) for liquid fuel that has entered ventilation/pressure-equalizing system (1).

Figure 2:
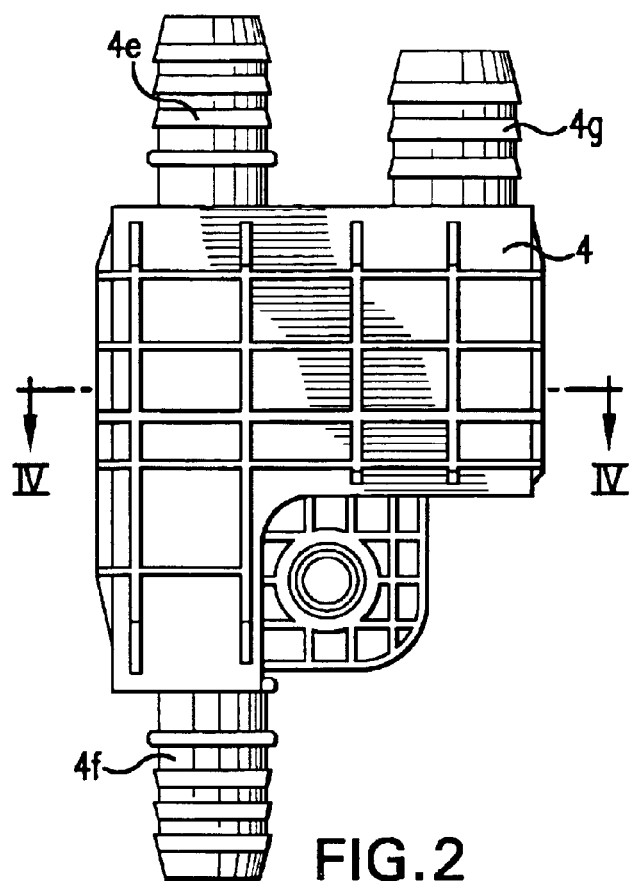
FIG. 2 is a top view of a collection device for use in the ventilation/pressure-equalizing system according to the present invention illustrated in FIG. 1.
Figure 3:
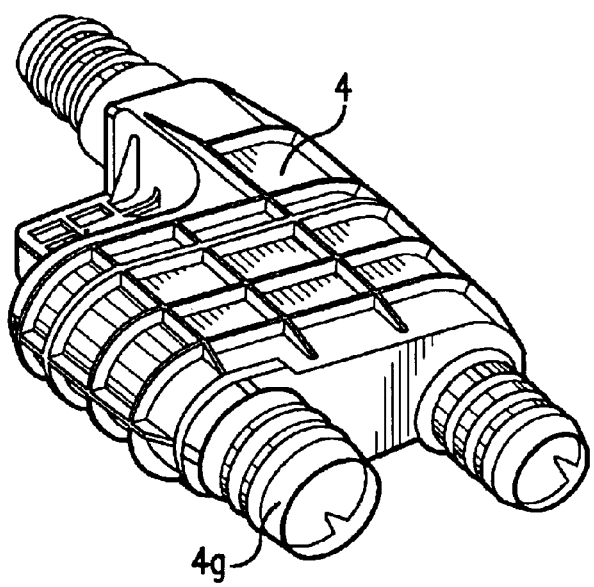
FIG. 3 is a perspective view of the collection device illustrated in FIG. 2.

FIGS. 2 through 4 illustrate an example embodiment of collection device (4) of the present invention. FIG. 5 illustrates this collection device (4) in an installation arrangement (top view) in accordance with FIG. 1. Collection device (4) has first connections (4e, 4f) for de-aeration lines (3a, 3b) provided inside of fuel tank (2). First connections (4e, 4f) lead directly into first chamber (4a), which is used as the collection volume for liquid fuel in addition to lines (3a, 3b).

First chamber (4a) is separated from second chamber (4b) by a largely level dividing wall (4c), a through hole (4d) enabling gases and vapors to be reliably removed. Through hole (4d) is so high with respect to the level that a fuel surge flowing through lines (3a, 3b) may not or may barely splash over dividing wall (4c). A de-aeration line (3c) leading in an outward direction is connected to second chamber (4b). Other aeration/de-aeration line configurations may be provided in modified example embodiments, the collection device being able to be used in each case as a branching element within the ventilation/pressure-equalizing system.

In the illustrated example embodiment, de-aeration lines (3a, 3b) are used both as a collection volume and return lines (5) for liquid fuel that has penetrated ventilation/pressure-equalizing system (1) in an undesired manner and is to be returned to the (main) fuel tank volume. Their end segments are provided with float-roll-over valves (7), which close lines (3a, 3b) as needed, i.e., in response to a threat of fluid entering from the (main) fuel tank volume to the ventilation/pressure-equalizing system.

Figure 6:
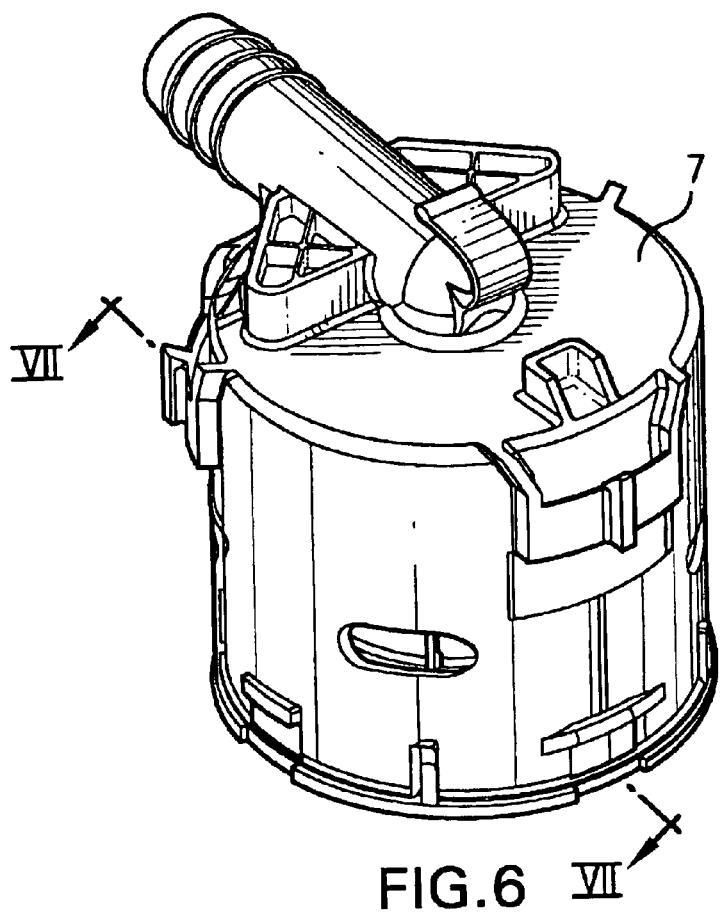
FIG. 6 is a perspective view of a roll-over valve for use in the ventilation/pressure-equalizing system according to the present invention illustrated in FIG. 1.
Figure 7:
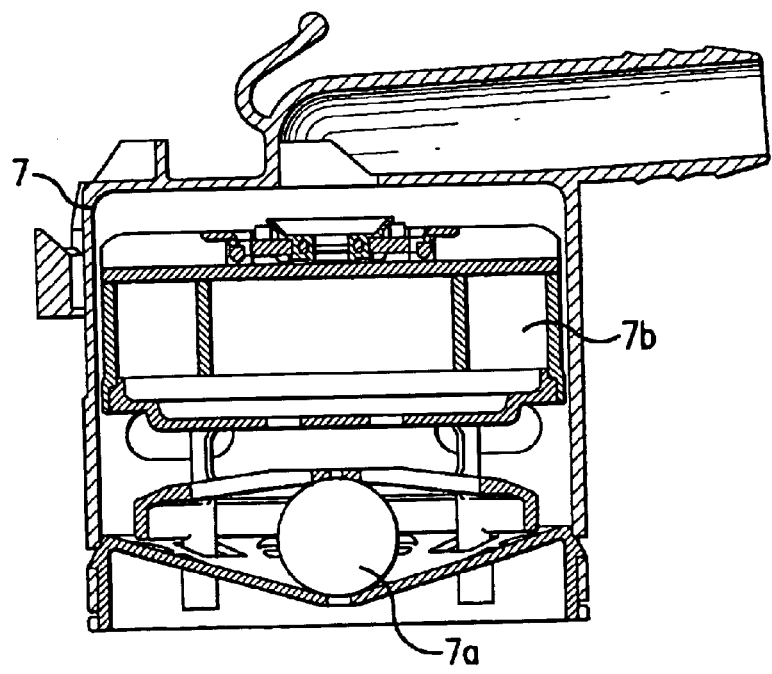
FIG. 7 is a cross-sectional view of the roll-over valve illustrated in FIG. 6 taken along the line VII—VII.

For this purpose, such a float-roll-over valve (7), illustrated in more detail in FIGS. 6 and 7, includes an inert spherical mass element (7a), that is supported on a funnel-shaped surface and, in response to an increase in transverse acceleration, is pressed toward the outside due to the effect of centrifugal forces, thereby blocking valve (7). A float element (7b) is provided that, in response to the valve being immersed in liquid fuel, is pressed in an upward direction due to buoyancy forces, thereby also blocking the valve. Moreover, as a result of forces due to weight, float element (7b) also causes valve (7) to close even in the case of an "upside down" fuel tank (roll-over). The valves only block on one side, so that liquid fuel may flow through the appropriate openings in the valves in the case of an approximately horizontally aligned ventilation/pressure-equalizing system.

Figure 8:
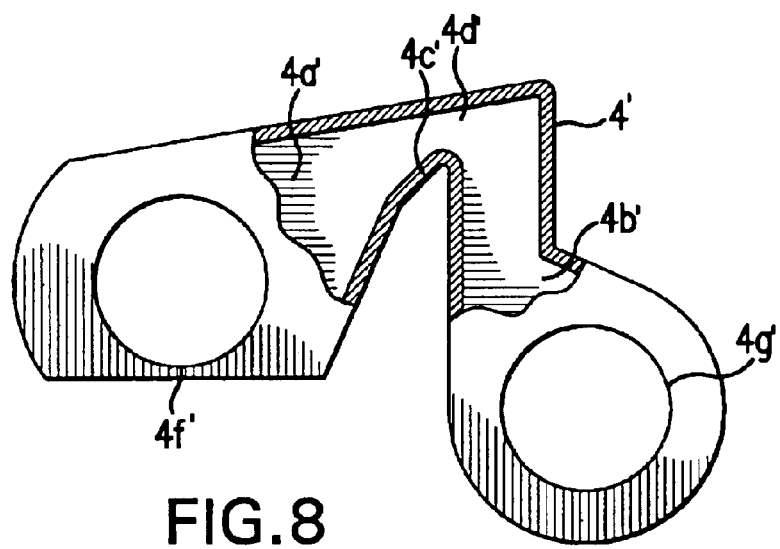
FIG. 8 is a partial cross-sectional side view of a modified collection device for use in the ventilation/pressure-equalizing system according to the present invention illustrated in FIG. 1.
Figure 9:
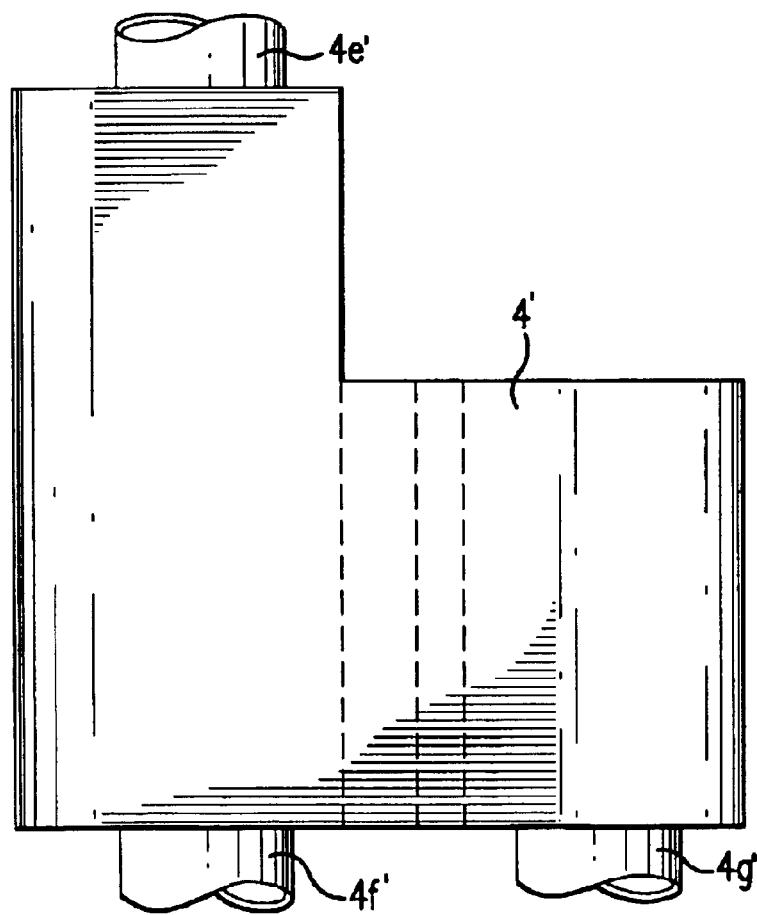
FIG. 9 is a top view of the modified collection device illustrated in FIG. 8.

FIGS. 8 and 9 illustrate a side view (FIG. 8) and a top view (FIG. 9) of a modified example embodiment of a collection device of the present invention. Illustrated collection device (4') includes two chambers (4a', 4b'), which are separated from one another by a dam-shaped wall (4c'), wall (4c') bordering a through hole (4d') for gases and/or vapors, which is higher that the maximum fuel level to be expected in chamber (4a'). The level of chamber (4b') may, thus, also be lower than that of chamber (4a') if this may be necessary for construction engineering purposes. Collection device (4') also includes line connections (4e', 4f', and 4g') for aeration/de-aeration lines and/or return lines and is, thus, used as a branching element.

Collection device (4) of the present invention ensures that no liquid fuel enters line (3c), which leads in an outward direction, in that a first chamber within the collection device is separated from the second chamber so that no fluid may travel from the first to the second chamber. However, at the same time, an exchange of gases via the through hole is ensured.

Like lines (3a', 3b', 3c'), collection device (4') may be made of a thermoplastic, fuel-resistant plastic and, thus, has a lower weight and a long lifetime, The ventilation/pressure-equalizing system of the present invention is particularly suitable for use in motor vehicle fuel tanks. Therefore, when, for example, in response to a cornering maneuver of the vehicle, the fuel in the largely filled fuel tank sloshes due to the effect of the inertial and centrifugal forces, the ventilation/pressure-equalizing system is flooded, and the float-roll-over valves are submerged in the liquid fuel. In this context, fuel may, in some instances, penetrate the ventilation/pressure-equalizing system in an undesired manner and flow through the de-aeration lines. However, de-aeration line (3c, 3c'), which leads in an outward direction (e.g., to an active carbon filter) is decoupled via collection device (4, 4') from lines (3a, 3a', 3b, 3b'), which are completely inside of the fuel tank, so that no liquid fuel may penetrate the line leading in an outward direction. Lines (3a, 3a', 3b, 3b'), which are arranged with a gradient in the case of an approximately horizontally aligned fuel tank, enable an unhindered backflow of liquid fuel into the fuel tank, so that there is also no fuel trapped in the ventilation/pressure-equalizing system. The through hole inside of the collection device may not be blocked by fluid, thereby further ensuring that the ventilation/pressure-equalizing system is not blocked by fluid in any situation.

What is claimed is:

1. A collection system for a ventilation/pressure-equalizing system, used to aerate and de-aerate a fuel tank, of a motor vehicle, the collection system comprising:
a collection arrangement that includes adjacent and separate chambers, wherein a first one of the chambers is used as a temporary storage chamber for liquid fuel and is connected to a return line in the fuel tank, wherein the chambers are configured so that for an approximately horizontal alignment of the fuel tank or the ventilation/pressure-equalizing system, liquid fuel does not travel from one of the chambers into the other of the chambers, wherein the liquid fuel that penetrates the ventilation/pressure-equalizing system is collected in the temporary storage chamber and emptiable via the return line in a case of a horizontally aligned fuel tank and de-aeration lines configured to connect to the collection arrangement, the de-aeration lines configured to aerate and de-aerate the fuel tank, at least one of the de-aeration lines connected to one of a non-return valve and a float-roll-over valve and wherein the chambers are separated by a vertically aligned wall, the wall having a through hole for the gases or fuel vapors.

2. The system of claim 1, wherein the return line is simultaneously used as at least one of an aeration line and a de-aeration line.

3. The system of claim 1, the return line has a gradient with respect to the fuel tank when it is horizontally aligned, so that the return line empties at its lowest point into the fuel tank.

4. The system of claim 3, wherein for the horizontally aligned fuel tank, the ventilation/pressure-equalizing system is at least approximately horizontally aligned, so that the temporary storage chamber is automatically emptiable via the return line to return the fuel to a main reservoir of the fuel tank.

5. The system of claim 1, wherein the collection arrangement is a branching element, and includes at least one of a flow obstacle and a labyrinth.

6. The system of claim 1, wherein:
the collection arrangement is configured to connect the return line and the de-aeration lines to one another, the de-aeration lines each ending in a different one of the chambers of the collection arrangement; and
a first one of the de-aeration lines is arranged between the collection arrangement and a tube line on a side of the fuel tank for discharging gases or fuel vapors from the main reservoir of the fuel tank, and a second one of the de-aeration lines is arranged between the collection arrangement and a line element located outside of the fuel tank.

7. The system of claim 6, wherein:
the first de-aeration line empties into the first chamber which is connected to the return line; and via the de-aeration lines, the fuel vapors or the gases may be conducted out of or into the fuel tank, and the fuel is separable from the flow of the fuel vapors or the gases via the collection arrangement, so as to collect any of the liquid fuel flowing through the de-aeration line.

8. The system of claim 6, wherein line element includes at least one of a fuel vapor filter and an active carbon filter.

9. The system of claim 6, wherein the return line is also used as an aeration/de-aeration line.

10. The system of claim 6, wherein the one of the non-return valve and the float roll-over valve, which prevents liquid fuel from entering, is arranged in one of the de-aeration lines.

11. The system of claim 6, wherein:
the de-aeration lines both empty into the first chamber of the collection arrangement, which is arranged in a middle region of the fuel tank, above a maximum fuel level for a horizontally arranged fuel tank, the first chamber forming a reservoir for liquid fuel that starts from the de-aeration lines and expands in an upward direction; and
the second chamber is arranged adjacent or above the first chamber, wherein a discharge-side of the second chamber extends directly over and into one of the de-aeration lines.

12. The system of claim 11, wherein the chambers and the wall therein include a labyrinth-like shape, so that the liquid fuel is separated in the first chamber of the collection arrangement.

13. The system of claim 11, wherein the collection arrangement is configured as a reverse siphon.

14. The system of claim 11, wherein for an almost horizontally arranged fuel tank, the de-aeration lines inside of the fuel tank have a certain inclination from a middle region, at which a highest point is located, to an outer region, at which a lowest point is located and at which the valves are positioned.

15. The system of claim 11, wherein for a horizontally arranged fuel tank, the lines are also used as return lines for liquid fuel that has entered the ventilation/pressure-equalizing system.

16. The system of claim 1, wherein the wall is higher than an expected or possible maximum fluid level within the collection arrangement for a horizontally aligned fuel tank, and the through hole is above this maximum level.

17. The system of claim 16, wherein the wall is arranged so that liquid fuel overflows it in a dam-like manner.

18. The system of claim 1, wherein the valve is arranged at the lowest point of the de-aeration line.

19. The system of claim 1, wherein the de-aeration line with the valve is used as a return line through which separated fuel returns to the main reservoir of the fuel tank.

20. The system of claim 1, wherein the collection arrangement includes first connections for the de-aeration lines, the first connections leading directly into the first chamber, which is used as a collection volume for the liquid fuel in addition to the de-aeration lines.

21. The system of claim 1, wherein the first chamber is separated from the second chamber by the largely level dividing wall, the through hole being high with respect to a level that a fuel surge may flow through the lines so that the liquid fuel barely splashes over the dividing wall, one of the de-aeration lines leading in an outward direction is connected to the second chamber.

22. The system of claim 1, wherein the float-roll-over valves are configured to close the lines in response to a threat of the liquid fuel entering from the main fuel tank to the ventilation/pressure-equalizing system.

23. The system of claim 22, wherein the float-roll-over valve includes an inert spherical mass element that is supported on a funnel-shaped surface and, in response to an increase in transverse acceleration, is pressed toward the outside to block the valve.

24. The system of claim 23, further comprising a float element that, in response to the valve being immersed in the liquid fuel, is pressed in an upward direction to block the valve.

25. The system of claim 24, wherein the float element also causes the valve to close even for a roll-over of the vehicle.

26. The system of claim 22, wherein the valves only block on one side, so that the liquid fuel may flow through openings in the valves for an approximately horizontally aligned ventilation/pressure-equalizing system.

27. The system of claim 22, wherein, in response to a cornering maneuver of the motor vehicle, the valves are submerged in the liquid fuel so that if any of the fuel penetrates the ventilation/pressure-equalizing system and flows through the de-aeration lines, one of the de-aeration lines leads in an outward direction to a filter and is decoupled via the collection arrangement from the lines, so that the liquid fuel does not penetrate the line leading in the outward direction.

28. The system of claim 1, wherein the chambers are separated by a dam-shaped wall, which borders the a through hole for the gases or fuel vapors, and which is higher than an expected maximum fuel level, and the collection arrangement includes line connections for the de-aeration lines or return lines, and is used as a branching element.

29. The system of claim 1, wherein the collection arrangement is made of a thermoplastic, fuel-resistant plastic.

30. The system of claim 1, wherein the lines are arranged with a gradient for an approximately horizontally aligned fuel tank, so as to enable an unhindered backflow of the liquid fuel into the fuel tank, so that the fuel is not trapped in the ventilation/pressure-equalizing system.

31. The system of claim 1, wherein the first chamber is separated from the second chamber by a largely level dividing wall, so that a level of the second chamber is not greater than a level of the first chamber.

32. The system of claim 1, wherein the first chamber is used a branching element within the ventilation/pressure-equalizing system.

* * * * *

UNITED STATES PATENT AND TRADEMARK OFFICE
CERTIFICATE OF CORRECTION

PATENT NO. : 6,871,662 B2
DATED : March 29, 2005
INVENTOR(S) : Duermeier et al.

It is certified that error appears in the above-identified patent and that said Letters Patent is hereby corrected as shown below:

Column 1,
Line 35, change "manner, may be collected" to -- manner may be collected --;
Line 46, change "at it lowest point" to -- at its lowest point --;

Column 5,
Line 67, change "quantative" to -- quantitative --;

Column 8,
Line 2, change "which borders the a" to -- which borders a --; and
Line 19, change "used a branching element" to -- used as a branching element --.

Signed and Sealed this

First Day of November, 2005

JON W. DUDAS
*Director of the United States Patent and Trademark Office*